United States Patent [19]
Teramoto et al.

[11] Patent Number: 5,999,251
[45] Date of Patent: Dec. 7, 1999

[54] LENS TESTING APPARATUS AND A LENS ADJUSTING APPARATUS

[75] Inventors: Tougo Teramoto, Wakayama; Tetsuya Arimoto, Sakai, both of Japan

[73] Assignee: Minolta Co., Ltd., Osaka, Japan

[21] Appl. No.: 09/031,607

[22] Filed: Feb. 27, 1998

[30] Foreign Application Priority Data

Dec. 16, 1997 [JP] Japan .................................. 9-346653

[51] Int. Cl.⁶ .................................................. G01B 9/00
[52] U.S. Cl. ...................... 356/127; 356/400; 250/201.1
[58] Field of Search .................... 356/124, 125, 356/126, 127, 400, 399, 153; 359/504, 506, 811–830; 250/201.1, 206.2

[56] References Cited

U.S. PATENT DOCUMENTS

| | | | |
|---|---|---|---|
| 2,352,179 | 6/1944 | Bolsey | 356/127 |
| 3,495,913 | 2/1970 | Hoagland | 356/124 |
| 3,542,476 | 11/1970 | Nord | 356/124 |
| 4,099,877 | 7/1978 | Brouwer | 356/124 |
| 4,772,123 | 9/1988 | Rader | 356/400 |
| 5,017,005 | 5/1991 | Shindo | 356/125 |
| 5,453,606 | 9/1995 | Hojo | 356/153 |
| 5,664,243 | 9/1997 | Okada et al. | |
| 5,844,670 | 12/1998 | Morita et al. | 356/124 |

FOREIGN PATENT DOCUMENTS 6-265766   9/1994   Japan .

*Primary Examiner*—Hoa Q. Pham
*Attorney, Agent, or Firm*—Burns, Doane, Swecker & Mathis, LLP

[57] ABSTRACT

A lens testing apparatus detects and evaluates inclination of the image plane as caused by decentering of an optical system. The apparatus has an image provider, a plurality of focusing position detectors, and a calculator. The image provider provides an image to a lens system to be tested for decentering. The detectors detect a focusing position on which light rays exiting from the lens system focus. The calculator calculates inclination of the image plane based on the focusing position detected by the detectors.

29 Claims, 6 Drawing Sheets

LENS TESTING APPARATUS AND A LENS ADJUSTING APPARATUS

This application is based on application No. H09-346653 filed in Japan, the content of which is hereby incorporated by reference.

BACKGROUND OF THE INVENTION

1. Field of the Invention

The present invention relates to a testing apparatus for detecting and evaluating inclination of an image plane as caused by decentering of an optical system, and to an adjusting apparatus for correcting such inclination.

2. Description of the Prior Art

It is well known that decentering of an optical system with respect to its optical axis causes decentering-related aberrations such as axial coma, in which even axial light rays exhibit coma that extends along the optical axis, and one-sided blurring, in which off-axial light rays striking different parts of the periphery of a screen focus on different positions along the optical axis. As an apparatus for testing and adjusting imaging performance of an optical system in such aspects, Japanese Laid-open Patent Application No. H6-265766 discloses an optical axis adjusting apparatus for use in a lens system, though it only corrects axial coma mentioned above.

However, in recent years, as higher and higher magnifications are realized in zoom optical systems for single-lens reflex cameras, it is becoming more and more difficult to obtain desired optical performance in end products simply by producing components to such precision as is conventionally required, and it is becoming necessary to correct also one-sided blurring mentioned above. Conventionally, whereas a method for correcting axial coma has been well established, no convenient method has been known to date for quickly checking the optical performance at the periphery of a screen to detect one-sided blurring in particular and make appropriate adjustments.

SUMMARY OF THE INVENTION

An object of the present invention is to provide a testing apparatus, having a simple construction, for quickly detecting and evaluating inclination of an image plane that is caused by decentering of an optical system and that in turn causes decentering-related aberrations as mentioned above.

Another object of the present invention is to provide an adjusting apparatus for adjusting a particular lens in accordance with a result detected by such a testing apparatus in order to correct one-sided blurring and other aberrations.

To achieve the above objects, according to one aspect of the present invention, a lens testing apparatus is provided with a plurality of focusing position detectors for detecting a focusing position on which light rays exiting from a lens system to be tested focus; and a calculator for calculating inclination of an image plane caused by relative decentering of the lens components based on the focusing position detected by the plurality of focusing position detectors.

According to another aspect of the present invention, a lens adjusting apparatus for adjusting a lens system by centering it with respect to an optical axis of an imaging optical system that includes at least the lens system is provided with a holder for holding the lens system to be centered in such a way as to be adjustable at least in a direction perpendicular to the optical axis of the imaging optical system; a plurality of focusing position detectors for detecting a focusing position on which light rays exiting from the imaging optical system focus; a calculator for calculating inclination of an image plane caused by relative decentering of the imaging optical system based on the focusing position detected by the plurality of focusing position detectors; and a controller for specifying a direction in which the lens system to be centered should be moved from its current position to reach a position at which optimal optical performance is obtained based on the inclination of the image plane calculated by the calculator.

According to another aspect of the present invention, a lens testing apparatus is provided with an image provider for providing an image to a lens system to be tested for decentering; a plurality of focusing position detectors for detecting a focusing position on which light rays exiting from the lens system to be tested focus; and a calculator for calculating inclination of an image plane caused by relative decentering of the lens components based on the focusing position detected by the plurality of focusing position detectors.

According to another aspect of the present invention, a lens adjusting apparatus for adjusting a lens system by centering it with respect to an optical axis of an imaging optical system that includes at least the lens system is provided with an image provider for providing an image to the lens system to be centered; a holder for holding the lens system to be centered in such a way as to be adjustable at least in a direction perpendicular to the optical axis of the imaging optical system; a plurality of focusing position detectors for detecting a focusing position on which light rays exiting from the imaging optical system focus; a calculator for calculating inclination of an image plane caused by relative decentering of the imaging optical system based on the focusing position detected by the plurality of focusing position detectors; and a controller for specifying a direction in which the lens system to be centered should be moved from its current position to reach a position at which optimal optical performance is obtained based on the inclination of the image plane calculated by the calculator.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
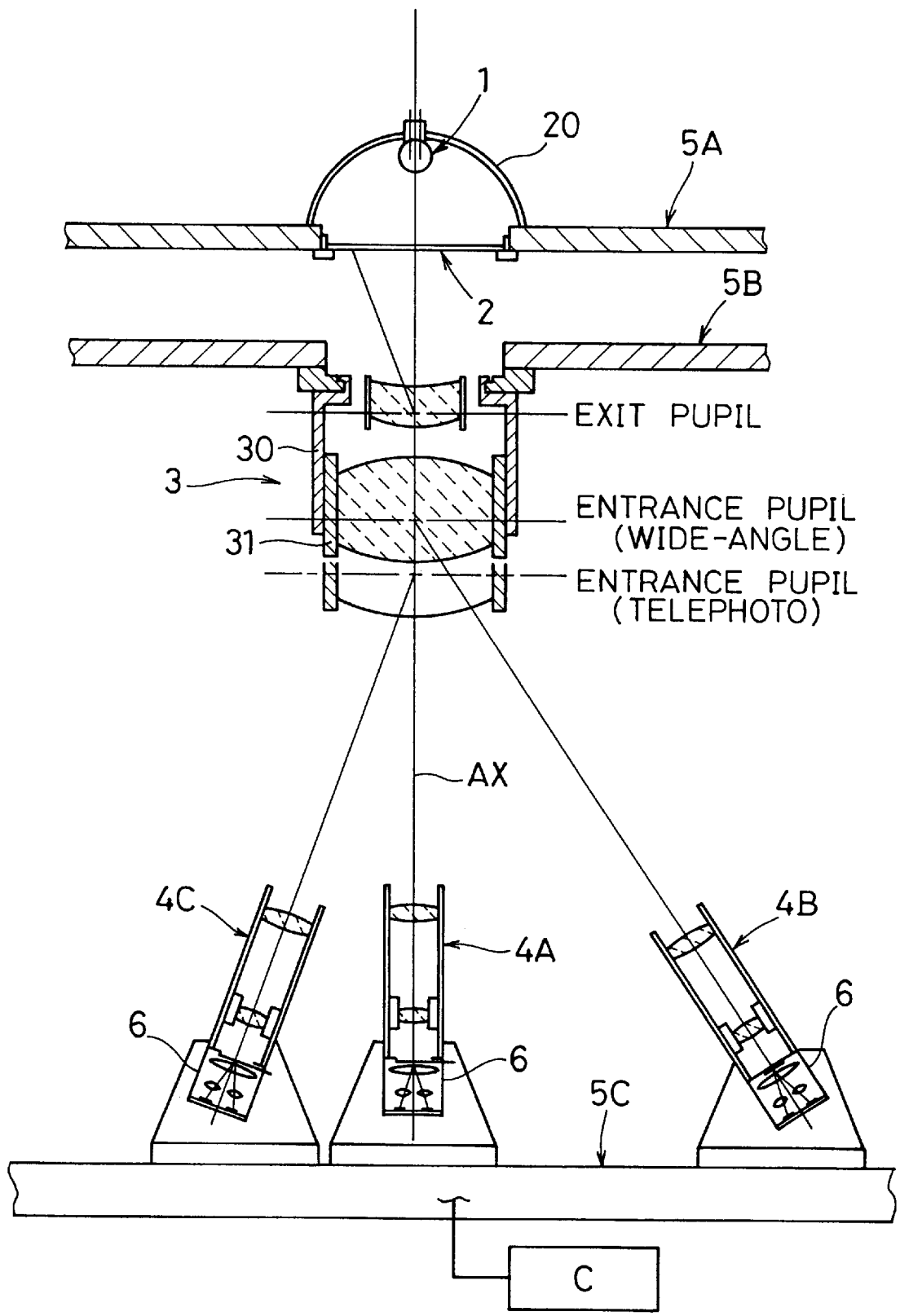
FIG. 1 is a vertical cross-section schematically showing the basic construction of a lens testing apparatus according to the present invention.

Hereinafter, embodiments of the present invention will be described with reference to the drawings. FIG. 1 is a vertical cross-section schematically showing the basic construction of a lens testing apparatus according to the invention. As shown in FIG. 1, the lens testing apparatus has, in its topmost portion along its vertically arranged optical axis AX, a light source 1. The light source 1 illuminates a chart 2 that is provided below it for the testing of the image plane. The light that has passed through the chart 2 then passes through a lens 3 to be tested that is provided further below on the optical axis AX, entering the lens 3 at its exit pupil and leaving it at its entrance pupil. The entrance pupil of the tested lens 3 comes at different positions on the optical axis AX depending on what focal length between the wide-angle end and the telephoto end the lens 3 is set to.

Out of the light that has left the tested lens 3 at its entrance pupil, axial rays end up entering a detecting system 4A that is provided near the bottom of the apparatus and on the optical axis AX for the detection of axial rays, and off-axial rays end up entering either a plurality of detecting systems 4B or a plurality of detecting systems 4C that are provided near the bottom of the apparatus and around the optical axis AX for the detection of off-axial rays in wide-angle condition (4B) or in telephoto condition (4C). Each of these detecting systems 4A, 4B, and 4C is arranged with such inclination as to point to the entrance pupil of the tested lens 3. The light source 1 and the chart 2 are fixed on a base 5A that is provided at the top of the apparatus. The light source 1 is fixed to the base 5A through a concave mirror 20. The tested lens 3 is fixed on another base 5B that is provided at a predetermined interval below the base 5A inside the apparatus. A lens barrel 30 is fixed to the base 5B, and a lens holder 31 is slidably fitted into the lens barrel 30. The detecting systems 4A, 4B, and 4C are fixed on still another base 5C that is provided at the bottom of the apparatus.

The detecting systems 4A, 4B, and 4C have, at their respective bottom end, a focus detector 6, which detects the image plane onto which the tested lens 3 projects the image from the chart 2. In the embodiment under discussion, all the focus detectors 6 are of the type that adopts the phase-difference detection method, so that their having no movable parts allows quicker detection. The focus detectors 6 are individually connected to a controller C (shown at the bottom of FIG. 1) that includes, for example, a microcomputer. The controller C calculates the inclination of the image plane on the basis of the information obtained from the detecting systems, and eventually instructs how the tested lens 3 should be adjusted. These operations will be described in detail later.

Figure 2:
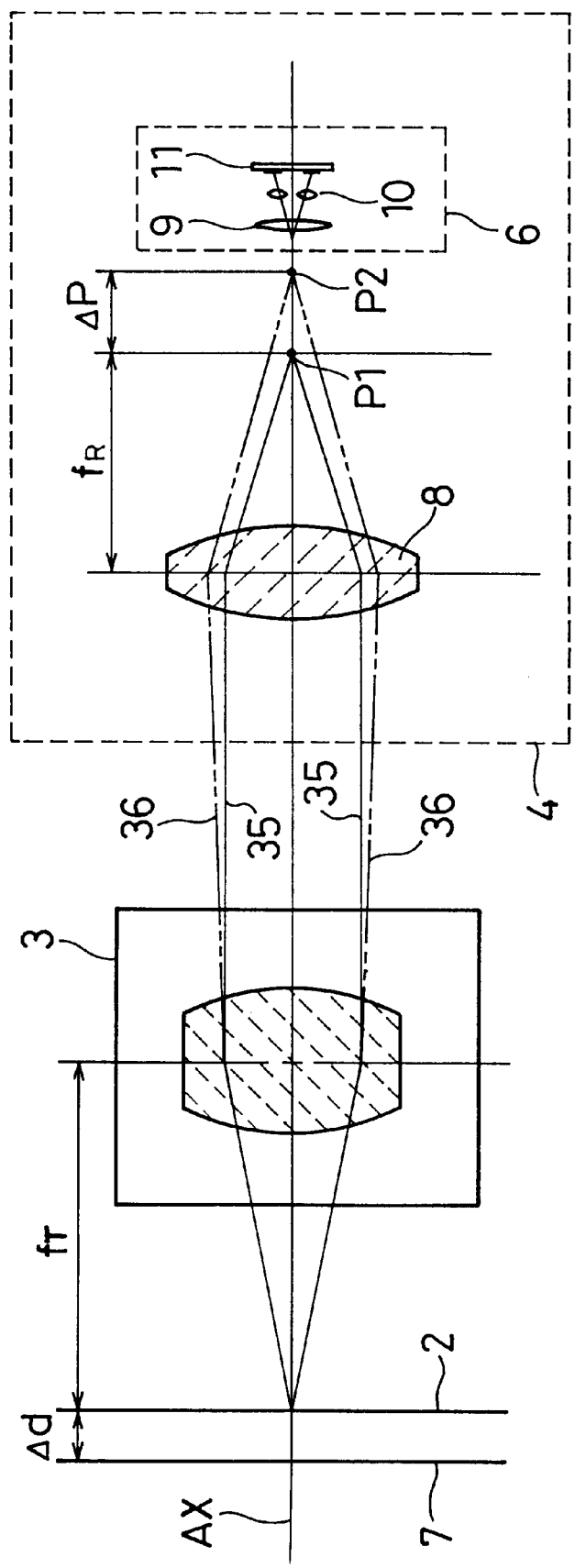
FIG. 2 is a diagram schematically showing the basic construction of the optical system of the lens testing apparatus of the invention.

FIG. 2 is a diagram schematically showing the basic construction of the optical system of the lens testing apparatus of the invention. Note that, in this figure, only the focus detector for axial rays is shown as representative of all the focus detectors. Suppose that, as shown in FIG. 2, the chart 2 is placed at a distance $f_T$ equal to the focal length of the tested lens 3 in front of (on the image-plane side of) it. Then, the rays emanating from the point at which the optical axis AX cuts the chart surface pass through the tested lens 3, and, as the rays leave the lens 3 from its object-side surface, the rays become parallel to the optical axis AX, as indicated by solid lines 35, as long as the tested lens 3 is completely aberration-free. The parallel rays then enter the detecting system 4, and, after passing through a relay lens 8 provided inside the detecting system 4, the rays focus on a point P1 on the optical axis AX at a distance $f_R$ equal to the focal length of the relay lens 8 behind it.

In reality, however, no lens is completely aberration-free, and therefore the rays, once they have passed through the tested lens 3, start diverging about the optical axis AX, as indicated by dash-dot-dot 36 lines in the figure. These rays then enter the detecting system 4, and, after passing through the relay lens 8, the rays focus on a point P2 on the optical axis AX at a distance ΔP further behind the point at the distance $f_R$ behind the relay lens 8. This deviation, i.e. the extra distance ΔP, is detected by the focus detector 6. As mentioned previously, in the embodiment under discussion, the focus detector 6 adopts the phase-difference detection method. Specifically, as shown in FIG. 2, the focus detector 6 detects focus by dividing the incoming light into two beams through a condenser lens 9, refocusing the image on the chart 2 onto two areas over the surface of a CCD (charge-coupled device) 11 through two separator lenses 10, and detecting the distance between the two images thus formed.

By converting the above deviation ΔP of the focus into a deviation with respect to the chart surface, the actual image plane 7 is found to be at a distance Δd in front of the chart 2, i.e. deviated therefrom by the distance Δd, as shown in FIG. 2. The conversion is performed according to the expression $$\Delta d = (f_T/f_R)^2 \Delta p,$$

and therefore, according to this expression, the deviation of the image plane can be calculated from the deviation of the focus. Note that, instead of the phase-difference detection method, it is also possible to adopt, for example, the so-called contrast detection method. However, in the contrast detection method, the testing takes more time than in the phase-difference detection method because it is necessary to perform scanning to find out the position at which the best contrast is obtained by moving the detecting system along the optical axis of the tested rays.

Figure 3A:
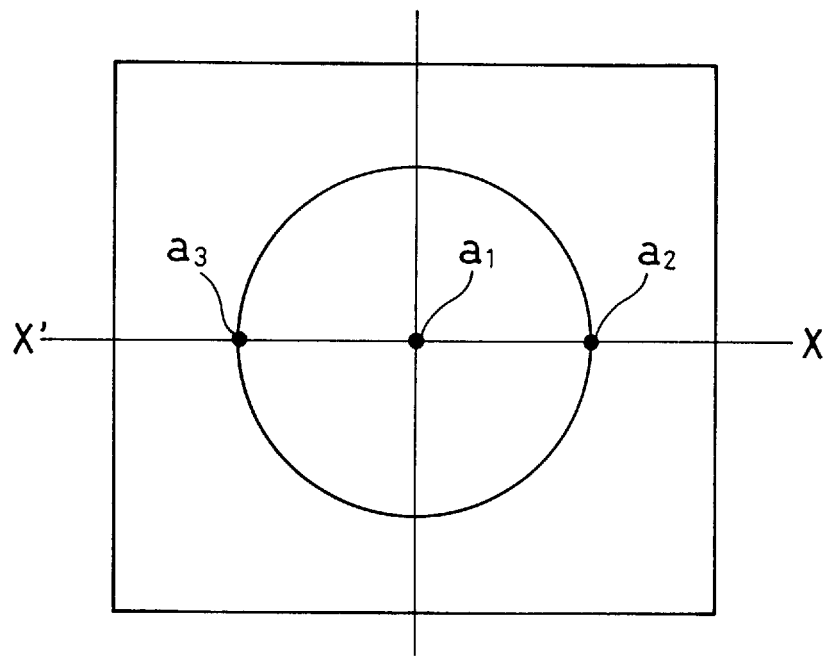
FIG. 3A is a diagram showing an example of the arrangement of detecting systems.
Figure 3B:
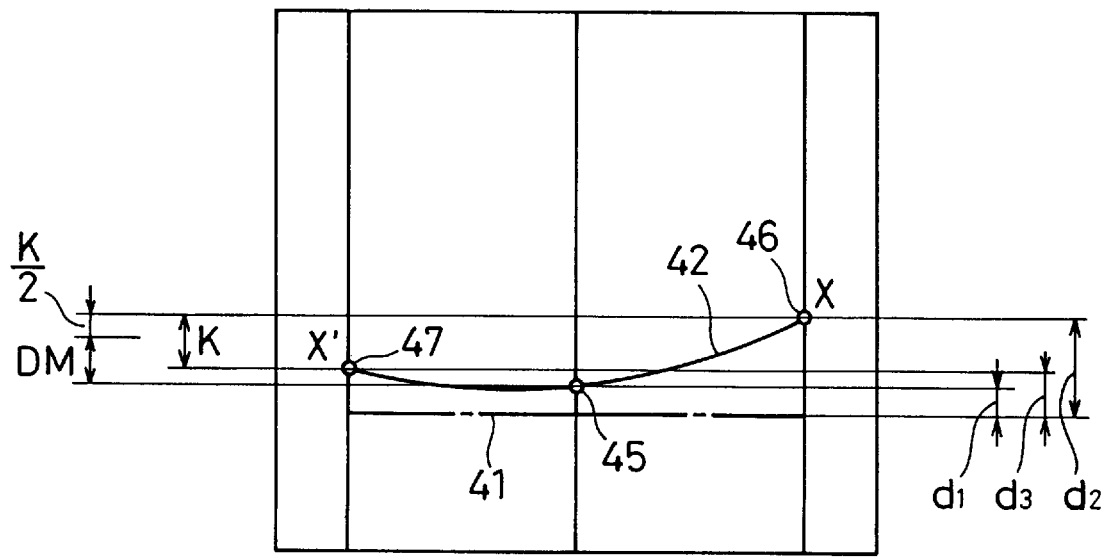
FIG. 3B is a graph showing the output obtained in the arrangement shown in FIG. 3A.

FIG. 3A is a diagram showing an example of the arrangement of the abovementioned detecting systems, and FIG. 3B is a graph showing the output obtained in the arrangement shown in FIG. 3A. As shown in FIG. 3A, three detecting systems, for example, are arranged along a line (for example, X-X') on a plane perpendicular to the optical axis AX. Of these detecting systems, the one at the central position $\alpha_1$ is placed precisely on the optical axis AX, and the ones at the right-hand and left-hand positions $\alpha_2$ and $\alpha_3$ are placed at the intersections between the above-mentioned line X-X' and a circle about the optical axis AX. Disposed at $\alpha_1$ is a detecting system 4A for axial rays, and disposed at $\alpha_2$ and $\alpha_3$ are either detecting systems 4B for off-axial rays in wide-angle condition or detecting systems 4C for off-axial rays in telephoto condition, depending on whether the testing is conducted with respect to the wide-angle or telephoto end.

As shown in FIG. 3B, the output from each detecting system represents the distance, as measured at the respective position, of the actual image plane from the chart surface, which is indicated by a dash-and-dot line 41; specifically, the detecting systems at $\alpha_1$, $\alpha_2$, and $\alpha_3$ output the distances $d_1$, $d_2$, and $d_3$, respectively. The spline curve 42 obtained by interpolating the points plotted in the graph represents the shape of the actual image plane. Note here that the difference K between the distance $d_2$ of the image plane from the chart surface as measured at the right-hand peripheral position and the same distance $d_3$ as measured at the left-hand peripheral position is called the one-sided blurring; on the other hand, the value DM obtained by first calculating the difference between the distance of the image plane from the chart surface as measured at the central position and the same distance as measured at that one of the peripheral positions which yields the greater output and then subtracting K/2 from the calculated difference is called the curvature of field.

Figure 4A:
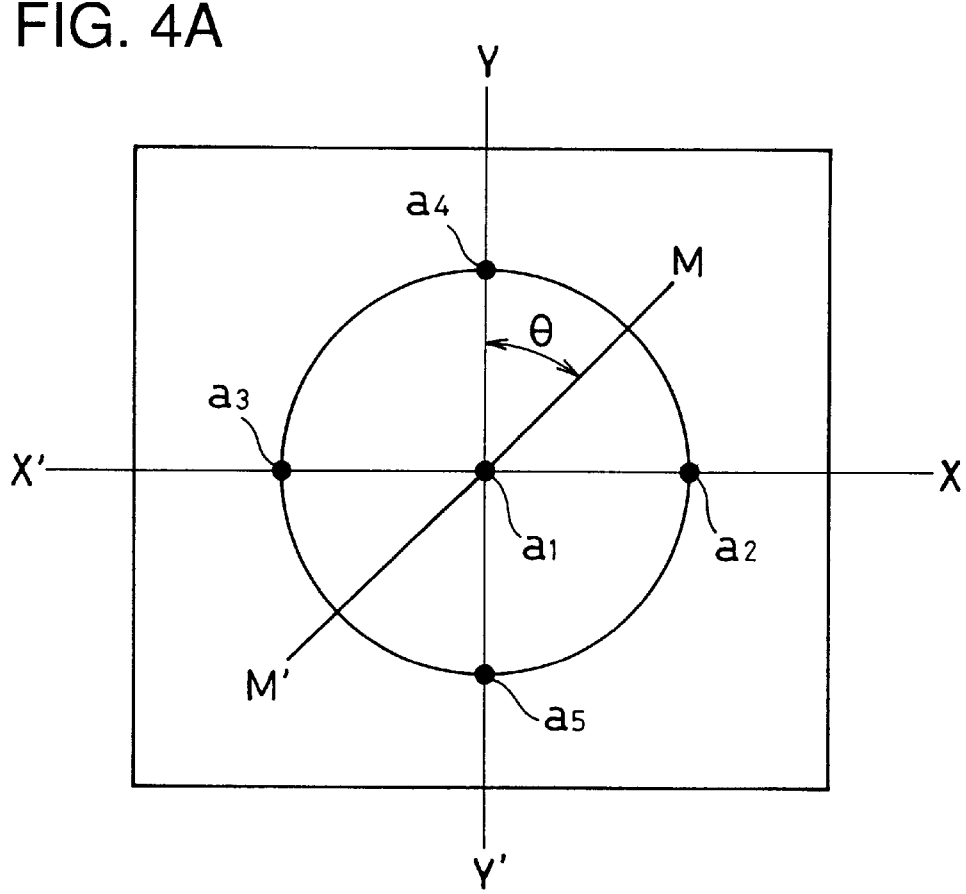
FIG. 4A is a diagram showing another example of the arrangement of detecting systems that has more detecting systems.
Figure 4B:
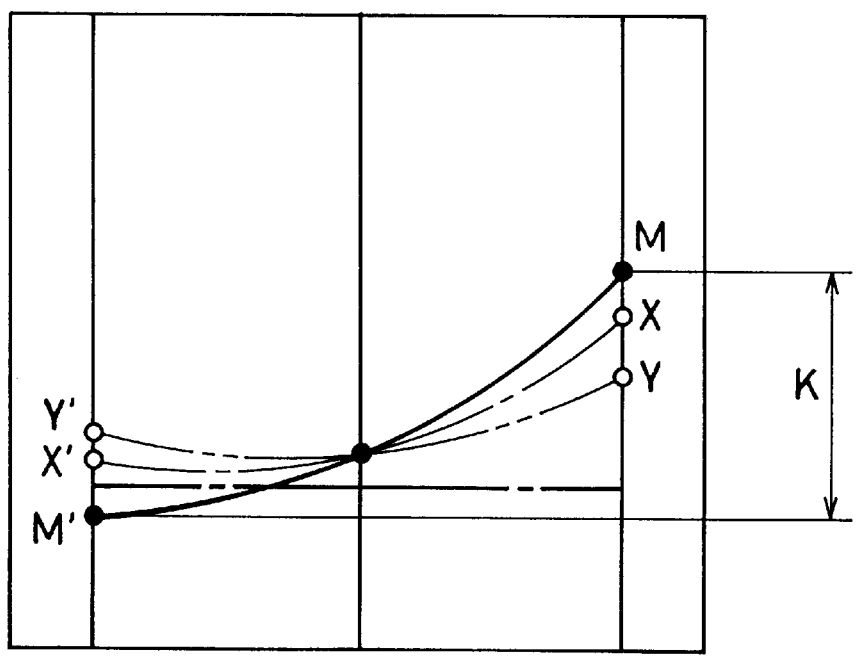
FIG. 4B is a graph showing the output obtained in the arrangement shown in FIG. 4A.

However, the above-described testing is not sufficient to grasp the maximum inclination of the image plane and its direction. To make that possible, as shown in FIG. 4A, the testing is conducted with two additional detecting systems placed at positions α4 and α5, which are, for example, at the intersections between the above-mentioned circle and the line Y-Y' that intersects the line X-X' at right angles at the central position. Then, the line M-M' is determined that represents the direction in which the inclination of the image plane is greatest, and the angle θ between this line M-M' and the line Y-Y' is calculated. As shown in FIG. 4B, the curvature of field along each line can be expressed as a spline curve, and the difference K between the distance of the image plane from the chart surface as measured at one of the peripheral positions along the line M-M', which indicates the direction in which the inclination is greatest, and the same distance as measured at the other is called the maximum amount of one-sided blurring.

Figure 5:
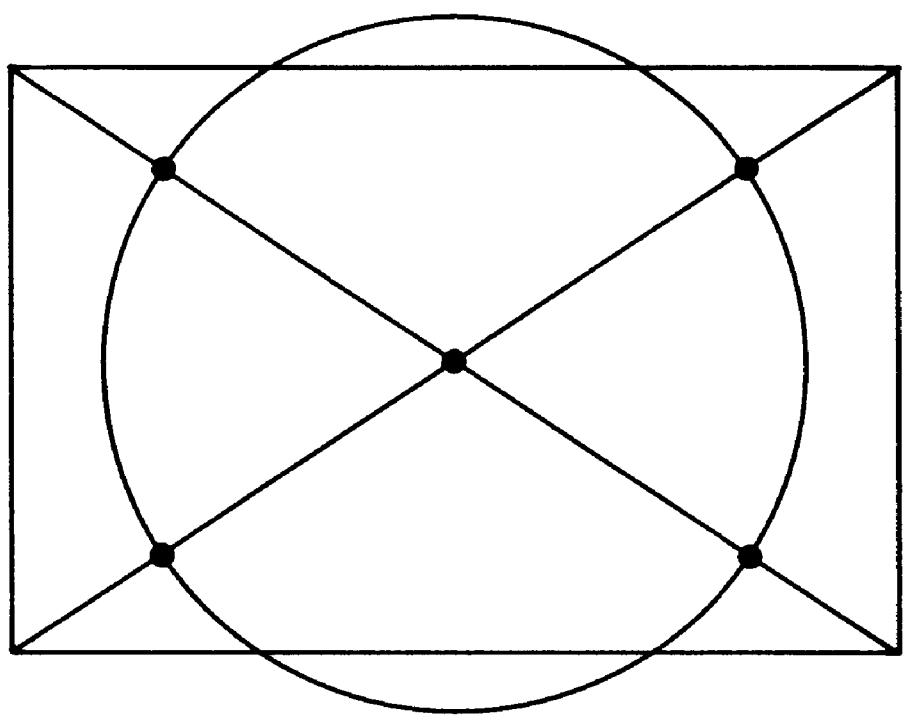
FIG. 5 is a diagram showing still another example of the arrangement of detecting systems in which detecting systems are arranged on the diagonals of the image frame.

The detecting systems do not necessarily have to be arranged on two lines perpendicular to each other as described above; instead, they may be arranged in any manner that suits the intended uses of the tested lens. For example, as shown in FIG. 5, in taking optical systems for use in silver-halide film cameras and digital video cameras, where the effective area of the image plane onto which images are projected is oblong, it will be more practical to arrange the detecting systems on the diagonals of the image frame and on a circle having its center at the intersection of those diagonals. Note also that, theoretically, it is necessary to use at least three detecting systems, i.e. not necessarily four, to achieve the desired detection. Moreover, it is preferable that the chart 2 have a pattern that spreads in the meridional direction, because the sensitivity to decentering is higher in the meridional direction than in the sagittal direction, and therefore the focusing position can be detected more efficiently in the meridional direction.

Figure 6A:
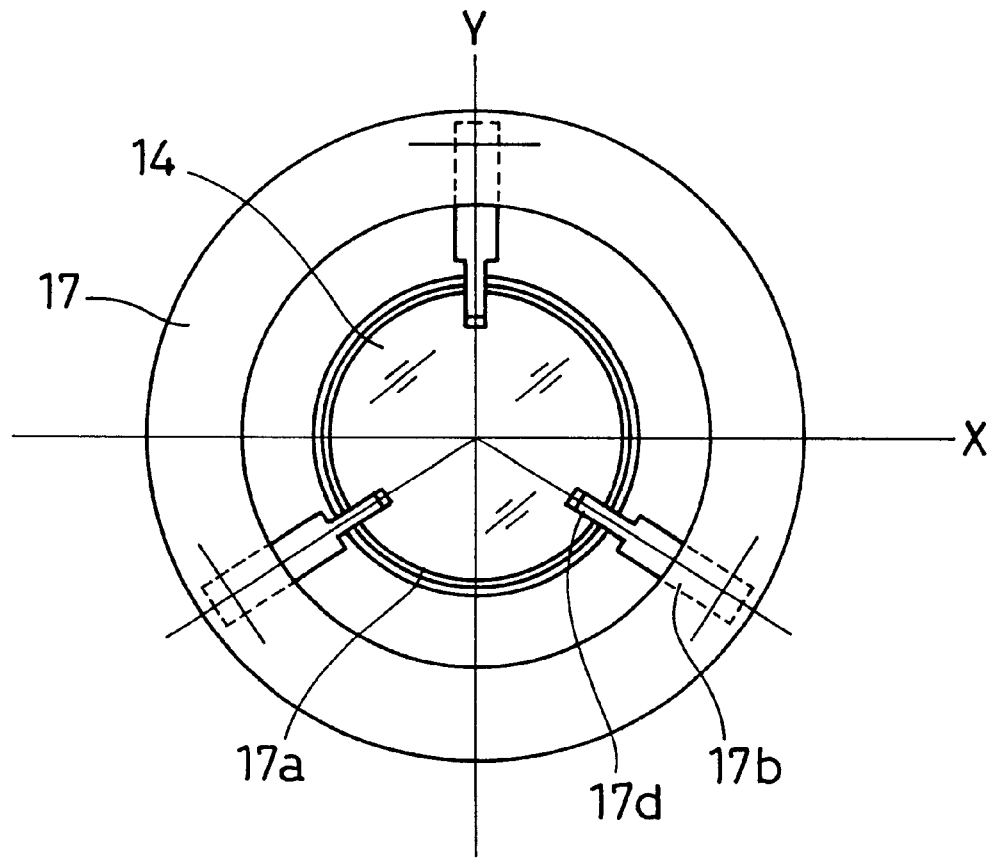
FIGS. 6A and 6B are diagrams schematically showing the basic construction of a lens adjusting apparatus according to the invention.
Figure 6B:
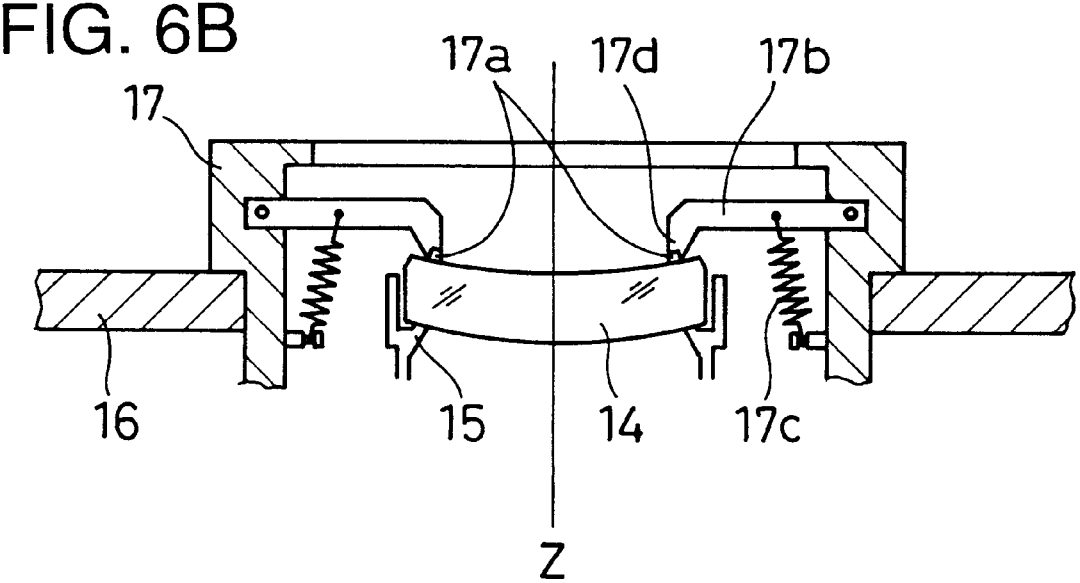

FIG. 6A is a top view and FIG. 6B is a vertical cross-section schematically showing the basic construction of a lens adjusting apparatus according to the invention. As shown in FIG. 6B, the lens adjusting apparatus has an XY table 16 that is movable along two axes (X and Y) perpendicular to the optical axis Z. The XY table 16 is also movable along the optical axis Z. The XY table 16 has a circular opening that has a greater diameter than the lens system 14 that is a part of the tested lens 3. Into this opening of the XY table 16, an adjusting cylinder 17 is fitted from above whose external diameter is approximately equal to the diameter of the opening. The adjusting cylinder 17 has its top end formed into a flange-like shape so as not to drop downward out of the XY table 16.

This lens adjusting apparatus is placed in an appropriate position on the base 5B below the base 5A shown in FIG. 1, and is used to center the tested lens 3. As shown in FIG. 6A, inside the adjusting cylinder 17, three spring-loaded feelers 17b are arranged at equal intervals. The feelers 17b are, at their respective outer end, fitted to the adjusting cylinder 17 so as to be vertically movable about their outer end. The feelers 17b are, at their center, each fitted with a spring 17c. In FIG. 6B, the springs 17c are in the expanded state, and are thus pulling the feelers 17b downward with adequate force to cause the tips (inner ends) 17d of the feelers 17b to press on the lens system 14 from above an O-ring 17a placed over the peripheral portion of the lens system 14.

Then, as the XY table 16 is moved along the X and Y axes, the lens system 14 is slightly displaced with respect to the lens frame 15 that is also a part of the tested lens 3. Meanwhile, advantageously, the lens system 14 is never damaged by excessive load, nor is the centering of the lens system 14 disturbed by its movement in unwanted directions. As a result, when, for example, the correction of the maximum amount of one-sided blurring and the centering have been completed, what remains to be done is simply to fix the lens system 14 to the lens frame 15. The fixing of the lens system 14 is achieved by means of a fixing mechanism separately provided in the tested lens 3, or with adhesive. The XY table 16 may be moved manually by an operator by means of a fine-adjustment screw (not shown) or the like in accordance with the data provided from the controller C of the previously-described lens testing apparatus as to the inclination of the image plane due to one-sided blurring or other as well as the instructions provided therefrom as to the direction in which the centering should be performed, or automatically by means of a motor (not shown) or the like that is driven in accordance with data provided through feedback.

Furthermore, to correct curvature of field, it is necessary that the lens system 14 be movable along the optical axis (in the Z direction). To achieve this, for example, a spacer such as a washer is additionally placed between the lens system 14 and the lens frame 15. It should be understood that, although a zoom lens barrel is used as an example of the tested lens in the embodiments described above, the present invention is applicable to any lens system that serves as an imaging lens.

As described heretofore, according to the present invention, it is possible to realize, with a simple construction, a testing apparatus for quickly detecting and evaluating inclination of an image plane caused by decentering of an optical system, an adjusting apparatus for adjusting a particular lens in accordance with a detection result in order to correct one-sided blurring and other aberrations, and a testing method and an adjusting method using such apparatuses.

Furthermore, it should be noted that, in connection with the design of optical systems in the future, the centering method according to the present invention will play an important role in:

1. achieving accurate and quick adjustment in a lens system that includes many aspherical surfaces as realized with lenses formed as single elements such as glass-mold lenses;
2. reducing component cost by eliminating the need of centering that is performed with reference to lens edges to secure higher assembly precision;
3. simplifying the construction of lens barrels by eliminating the need of such centering;
4. miniaturizing end products by miniaturizing lenses used in them;
5. adapting zoom lens barrels to higher zoom ratios;
6. coping with higher image resolution achieved by the use of higher-resolution image-sensing devices; and
7. coping with fixing of lenses with adhesive, automatic adjustment of lenses, and the like.

What is claimed is:

1. A lens testing apparatus comprising:
   a plurality of focusing position detectors for detecting a focusing position on which light rays exiting from a lens system to be tested focus; and
   a calculator for calculating inclination of an image plane caused by relative decentering of lens components in said lens system based on the focusing position detected by said plurality of focusing position detectors.

2. A lens testing apparatus as claimed in claim 1, wherein said plurality of focusing position detectors are arranged along a circumference of a circle symmetrically with respect to the optical axis of said lens system to be tested.

3. A lens testing apparatus as claimed in claim 1, wherein two focusing position detectors are arranged along said circumference symmetrically with respect to said optical axis.

4. A lens testing apparatus as claimed in claim 1, wherein said focusing position detectors each have a detecting optical system that matches said lens system to be tested with a pupil.

5. A lens testing apparatus as claimed in claim 4, wherein said focusing position detectors use a phase-difference detection method.

6. A lens testing apparatus as claimed in claim 4, wherein said detecting optical system is used to re-image an image.

7. A lens testing apparatus as claimed in claim 6, wherein said focusing position detectors use a phase-difference detection method.

8. A lens adjusting apparatus for adjusting a lens system by centering it with respect to an optical axis of an imaging optical system that includes at least said lens system, comprising:
   a holder for holding said lens system to be centered in such a way as to be adjustable at least in a direction perpendicular to the optical axis of said imaging optical system;
   a plurality of focusing position detectors for detecting a focusing position on which light rays exiting from said imaging optical system focus;
   a calculator for calculating inclination of an image plane caused by relative decentering of said imaging optical system based on the focusing position detected by said plurality of focusing position detectors; and
   a controller for specifying a movement direction in which said lens system to be centered should be moved from its current position to reach a position at which optimal optical performance is obtained based on the inclination of said image plane calculated by said calculator.

9. A lens adjusting apparatus as claimed in claim 8, wherein said plurality of focusing position detectors are arranged along a circumference of a circle symmetrically with respect to the optical axis of said imaging optical system.

10. A lens adjusting apparatus as claimed in claim 9, wherein two focusing position detectors are arranged along said circumference symmetrically with respect to said optical axis.

11. A lens adjusting apparatus as claimed in claim 8, wherein, after the movement direction is specified by said controller, movement amount is calculated.

12. A lens adjusting apparatus as claimed in claim 8, wherein said focusing position detectors each have a detecting optical system that matches said imaging optical system with a pupil.

13. A lens adjusting apparatus as claimed in claim 12, wherein said detecting optical system is used to re-image an image.

14. A lens adjusting apparatus as claimed in claim 13, wherein said focusing position detectors use a phase-difference detection method.

15. A lens testing apparatus comprising:
   an image provider for providing an image to a lens system to be tested for decentering;
   a plurality of focusing position detectors for detecting a focusing position on which light rays exiting from said lens system to be tested focus; and
   a calculator for calculating inclination of an image plane caused by relative decentering of lens components of said lens system based on the focusing position detected by said plurality of focusing position detectors.

16. A lens testing apparatus as claimed in claim 15, wherein said plurality of focusing position detectors are arranged along a circumference of a circle symmetrically with respect to the optical axis of said lens system to be tested.

17. A lens testing apparatus as claimed in claim 15, wherein two focusing position detectors are arranged along said circumference symmetrically with respect to said optical axis.

18. A lens testing apparatus as claimed in claim 15, wherein said focusing position detectors each have a detecting optical system that matches said lens system to be tested with a pupil.

19. A lens testing apparatus as claimed in claim 18, wherein said focusing position detectors use a phase-difference detection method.

20. A lens testing apparatus as claimed in claim 18, wherein said detecting optical system is used to re-image an image.

21. A lens testing apparatus as claimed in claim 20, wherein said focusing position detectors use a phase-difference detection method.

22. A lens adjusting apparatus for adjusting a lens system by centering it with respect to an optical axis of an imaging optical system that includes at least said lens system, comprising:
   an image provider for providing an image to said lens system to be centered;
   a holder for holding said lens system to be centered in such a way as to be adjustable at least in a direction perpendicular to the optical axis of said imaging optical system;
   a plurality of focusing position detectors for detecting a focusing position on which light rays exiting from said imaging optical system focus;
   a calculator for calculating inclination of an image plane caused by relative decentering of said imaging optical system based on the focusing position detected by said plurality of focusing position detectors; and
   a controller for specifying a movement direction in which said lens system to be centered should be moved from its current position to reach a position at which optimal optical performance is obtained based on the inclination of said image plane calculated by said calculator.

23. A lens adjusting apparatus as claimed in claim 22, wherein said plurality of focusing position detectors are arranged along a circumference of a circle symmetrically with respect to the optical axis of said imaging optical system.

24. A lens adjusting apparatus as claimed in claim 23, wherein two focusing position detectors are arranged along said circumference symmetrically with respect to said optical axis.

25. A lens adjusting apparatus as claimed in claim 22, wherein, after the movement direction is specified by said controller, movement amount is calculated.

26. A lens adjusting apparatus as claimed in claim 22, wherein said focusing position detectors each have a detecting optical system that matches said imaging optical system with a pupil.

27. A lens adjusting apparatus as claimed in claim 26, wherein said focusing position detectors use a phase-difference detection method.

28. A lens adjusting apparatus as claimed in claim 26, wherein said detecting optical system is used to re-image an image.

29. A lens adjusting apparatus as claimed in claim 28, wherein said focusing position detectors use a phase-difference detection method.

* * * * *